United States Patent [19]

Ehmann et al.

[11] 4,405,747
[45] Sep. 20, 1983

[54] AQUEOUS POLYVINYL ESTER DISPERSION, PROCESS FOR ITS PREPARATION, AND THE USE

[75] Inventors: Werner Ehmann, Frankfurt am Main; Helmut Rinno, Hofheim am Taunus, both of Fed. Rep. of Germany

[73] Assignee: Hoechst Aktiengesellschaft, Frankfurt am Main, Fed. Rep. of Germany

[21] Appl. No.: 367,883

[22] Filed: Apr. 13, 1982

[30] Foreign Application Priority Data

Apr. 15, 1981 [DE] Fed. Rep. of Germany ....... 3115163

[51] Int. Cl.$^3$ .................. C08F 18/08; C08L 31/02; C08J 3/06; C09J 3/14
[52] U.S. Cl. .................. 524/503; 524/487; 524/533
[58] Field of Search .................. 524/487, 503, 533

[56] References Cited

U.S. PATENT DOCUMENTS 2,404,519  7/1946  Morrison et al. .................. 524/487
3,997,489  12/1976  Coker .................. 524/503

FOREIGN PATENT DOCUMENTS 623053   7/1961   Canada .................. 524/503
745670   11/1966  Canada .................. 524/503
590      2/1979   European Pat. Off. .................. 524/458
54-160492 12/1979 Japan .................. 524/503
372599   5/1932   United Kingdom .................. 524/503
994380   6/1965   United Kingdom .................. 524/503

*Primary Examiner*—Ronald W. Griffin
*Attorney, Agent, or Firm*—Curtis, Morris & Safford

[57] ABSTRACT

An aqueous polyvinyl ester dispersion having a solids content of 40 to 70 percent by weight and containing 3 to 15 percent by weight (relative to the total amount of polyvinyl ester and additive) of a polyvinyl alcohol and 5 to 60 percent by weight (relative to the total amount of polyvinyl ester and additive) of a waxy, fatty or oily additive, has excellent adhesive properties. It is prepared by emulsion polymerization of a vinyl ester, if appropriate together with comonomers, in the presence of the said additive or by subsequent distribution of the additive in the dispersion resulting from the emulsion polymerization. The dispersion is particularly suitable for the preparation of adhesives for cellulose-containing materials.

4 Claims, No Drawings

AQUEOUS POLYVINYL ESTER DISPERSION, PROCESS FOR ITS PREPARATION, AND THE USE

The invention relates to a modified aqueous polyvinyl ester dispersion, to a process for its preparation, and to its use as an adhesive.

It is known to prepare, and to use for bonding various materials, in particular wood, aqueous polyvinyl acetate dispersions the polymers of which can also contain, as part of the polymer, small amounts of other olefinically unsaturated compounds which are copolymerizable with vinyl acetate. Such dispersions usually contain polyvinyl alcohol, which served as a protective colloid during the preparation or was added to the complete dispersion. The polymerization of vinyl acetate is usually carried out in emulsion in the aqueous solution of the polyvinyl alcohol by means of initiators which form free radicals (cf. German Auslegeschrift No. 1,151,663=British Pat. No. 994,380).

In addition to the properties which are required of any plastic dispersion, such as good flow and thus processability, absence of coagulates, storage stability and heat resistance, it is particularly important for polyvinyl acetate adhesive dispersions that a high bond strength is obtained.

It is customary to modify polyvinyl ester dispersions by incorporating substances which are compatible with polyvinyl acetate or lower the film-forming temperature and externally plasticize the dispersions; such substances are esters of phthalic acid, of sebacic acid, of adipic acid or of phosphoric acid, for example dibutyl phthalate. When using these substances various disadvantages arise, for example odor nuisance, toxicity or exudation of these additives. The high bonding strength of polyvinyl ester dispersions in the case of wood is based, inter alia, on a certain hardness and tenacity of the glued joint. This property is partially lost in the course of plasticizing.

It has also already been tried to incorporate into polyvinyl acetate dispersions containing polyvinyl alcohol, substances which are not compatible with polyvinyl acetate, for example aliphatic hydrocarbons (cf. U.S. Pat. No. 2,404,519). However, these materials, although they were finely dispersed by vigorous stirring and attempts were made to stabilize this state by cooling down the hot dispersions slowly, were not taken up permanently. They separated out on drying or during the subsequent warming-up of coats. This is the basis for the use of such dispersions for the preparation of relatively waterproof coatings.

The object of the invention is to provide a polyvinyl ester dispersion which contains a wax, fat and/or oil without exudation of these additives occurring from the applied and dried dispersions.

The invention thus relates to an aqueous polyvinyl ester dispersion having a solids content of 40 to 70 percent by weight, in which a part of the solids is a waxy, fatty or oily additive, which dispersion comprises 5 to 60 percent by weight (relative to the total amount of polyvinyl ester and additive) of a waxy, fatty or oily additive and 3 to 15 percent by weight (relative to the total amount of polyvinyl ester and additive) of a polyvinyl alcohol which has a degree of hydrolysis of 65 to 99.5 mole percent and a 4 percent by weight strength aqueous solution of which has a viscosity of 2 to 50 mPa.s, measured at a temperature of 20° C.

The invention also relates to a process for the preparation of an aqueous polyvinyl ester dispersion having a solids content of 40 to 70 percent by weight, in which a part of the solids is a waxy, fatty or oily additive, by free radical polymerization of a vinyl ester in an aqueous emulsion in the presence of a polyvinyl alcohol, which process comprises carrying out the polymerization in the presence of 3 to 15 percent by weight (relative to the total amount of polyvinyl ester and additive) of a polyvinyl alcohol which has a degree of hydrolysis of 65 to 99.5 mole percent and a 4 percent by weight strength aqueous solution of which has a viscosity of 2 to 50 mPa.s, measured at a temperature of 20° C., and in the presence of the waxy, fatty or oily additive.

The invention further relates to a process for the preparation of an aqueous polyvinyl ester dispersion having a solids content of 40 to 70 percent by weight, in which a part of the solids is a waxy, fatty or oily additive, by free radical polymerization of a vinyl ester in aqueous emulsion in the presence of polyvinyl alcohol, which process comprises carrying out the polymerization in the presence of 3 to 15 percent by weight (relative to the total amount of polyvinyl ester and additive), of a polyvinyl alcohol which has a degree of hydrolysis of 65 to 99.5 mole percent and a 4 percent by weight strength aqueous solution of which has a viscosity of 2 to 50 mPa.s, measured at a temperature of 20° C., and then homogeneously dispersing the waxy, fatty or oily additive in the dispersion obtained.

The polyvinyl alcohol used according to the invention is a hydrolysis of a polyvinyl acetate and has a degree of hydrolysis of 65 to 99.5 mole percent, preferably 80 to 99 mole percent. An aqueous, 4 percent by weight strength solution of the polyvinyl alcohol has a viscosity of 2 to 50, preferably 3 to 40 mPa.s (measured at a temperature of 20° C.). Preferably, a mixture of various polyvinyl alcohols is used which differ in their degree of a hydrolysis and/or in their molecular weight. The polyvinyl alcohol serves at least partially as a protective colloid in the emulsion polymerization. In this reaction, it is advantageous if the liquid phase for the polymerization contains no less than 5 percent by weight of polyvinyl alcohol. After the polymerization, further polyvinyl alcohol can be added to the dispersion. The polyvinyl alcohol is contained in the complete dispersion in an amount of 3 to 15, preferably 5 to 12, percent by weight (relative to the total amount of polyvinyl ester and additive).

The dispersion can contain 0.05 to 2 percent by weight (relative to the total amount of polyvinyl ester and additive) of ionic or nonionic emulsifiers, for example alkali metal salts of higher fatty acids, sulfated fatty alcohols, alkyl-, aryl- or alkylaryl-sulfonates, alkoxylated alcohols or phenols or their sulfation products, or block copolymers of polyalkylene oxides or sulfosuccinates.

The polyvinyl ester dispersed in the dispersion is a polymer of a vinyl ester of an aliphatic carboxylic acid having 2 to 18, preferably 2 to 12, carbon atoms, in particular vinyl acetate or vinyl propionate, vinyl butyrate, vinyl pivalate, vinyl isononate, vinyl laurate or vinyl decanate, or vinyl esters of branched carboxylic acids having 9 to 11 carbon atoms. The polyvinyl ester can also be a copolymer of various vinyl esters or a vinyl ester with another copolymerizable compound.

Suitable comonomers are, in particular, unsaturated carboxylic acids, for example acrylic acid, methacrylic acid, itaconic acid, maleic acid, maleic acid half-ester, maleic anhydride or vinylsulfonic acid and its alkali metal salts.

The solids content of the dispersion, (i.e.) the amount of non-volatile constituents of the dispersion, which include the abovementioned additives, is 40 to 70, preferably 48 to 68, percent by weight (determined in accordance with DIN 53,189). The additive can be introduced into the dispersion according to the invention by incorporating it into the dispersion obtained in the emulsion polymerization or by addition, continuous or in portions, in the course of the emulsion polymerization. However, the polymerization is preferably carried out completely in the presence of the total amount of the additive, since the components polyvinyl ester and additive, which are in themselves incompatible, are brought into the most intimate contact thereby. The additive must not contain constituents which prevent the polymerization.

The process according to the invention is carried out in the presence of an initiator which forms free radicals, in particular in the presence of a peroxide compound or an aliphatic azo compound. The initiator is soluble in water or soluble in the monomer. Preferably, a combination of a water-soluble and a monomer-soluble initiator is used. In this combination, the ratio by weight of water-soluble initiator to monomer-soluble initiator is 0.05:1 to 1.2:1, preferably 0.1:1 to 0.9:1. The total amount of the initiator or initiator mixture is within a range of 0.01 to 1 percent by weight, preferably 0.05 to 0.5 percent by weight (relative to the total amount of monomers). The initiator is added in total at the start of the polymerization or continuously metered in in the course of the polymerization.

Suitable peroxide compounds are in particular hydrogen peroxide, alkyl hydroperoxides, such as t-butyl hydroperoxide, diacyl peroxides, such as diacetyl peroxide, dilauroyl peroxide or dibenzoyl peroxide, also ammonium salts or alkali metal salts of peroxodisulfuric acid, such as sodium peroxodisulfate, potassium peroxodisulfate or ammonium peroxodisulfate, and alkyl esters of aliphatic percarboxylic acids or of peroxodicarbonic acid, such as isopropyl perisobutyrate, t-butyl perisobutyrate, isopropyl perpivalate, t-butyl perpivalate, isopropyl peroctoate, t-butyl peroctoate, diisopropyl percarbonate, di-t-butyl percarbonate, bis-(2-ethylhexyl) percarbonate or dicyclohexyl percarbonate.

Suitable azo compounds are, in particular, azobisisobutyronitrile and azo-γ,γ'-bis-(4-cyanovaleric acid).

The initiator or the initiator mixture is employed, if appropriate together with a heavy metal salt, the amount of the heavy metal salt being 2 to 50 ppm (relative to the total amount of monomers). Preferably a combination of hydrogen peroxide, of a further peroxide compound or of an azo compound and a heavy metal salt is used; suitable salts are, in particular, heavy metal salts of lower carboxylic acids, for example cobalt acetate and iron(II) acetate.

The initiator or the initiator mixture can also be used together with a reducing agent the amount of which is 0.05 to 0.5, preferably 0.1 to 0.3, percent by weight (relative to the total amount of monomers). Suitable reducing agents are, in particular, ammonium salts, alkali metal salts or alkaline earth metal salts of sulfur-containing acids having a reducing action, preferably sulfites, bisulfites, pyrosulfites, dithionites, thiosulfates or formaldehyde sulfoxylates.

The initiator can be added to the reaction mixture in total at the start of the polymerization or metered in continuously in the course of this polymerization. When using an initiator in combination with a reducing agent, one component of the Redox system is added in total to the polymerization mixture and the other component is metered in continuously.

The vinyl ester, if appropriate in combination with a comonomer or several comonomers, can be added continuously to the polymerization liquor or can be initially introduced in part into the reactor; the rest being added in the course of the polymerization. Furthermore, the vinyl ester can be added continuously in the form of a pre-emulsion together with polyvinyl alcohol, initiator and additive to the reactor. To control the reaction rate, retarding substances, preferably hydroquinone, hydroquinone derivatives or aromatic nitro compounds, can be employed. If appropriate, a commercial defoaming agent can also be used, for example an agent based on polysiloxane. However, a procedure is preferable in which all the raw materials are brought together in the reactor before the start of the polymerization.

An essential feature of the preparation process according to the invention is the use of a waxy, fatty or oily additive or of a mixture of such additives which do not exude from the film obtained from the dispersion.

"Waxy additives" are in particular understood as meaning hydrocarbon waxes, for example paraffins, ozokerites, microcrystalline waxes, synthetic paraffins and polyolefin waxes. Paraffins having a melting point below the boiling point of the vinyl ester, in particular having a melting point within a range of 45° to 70° C., are preferably used.

"Fatty additive" in particular denotes solid triglycerides of animal or vegetable origin, preferably tallow having a melting point of 35° to 50° C. or palm kernel oil having a melting point of 20° to 30° C. it being also possible for these fats to be hydrogenated, for example hydrogenated tallow having a melting point of 55° to 60° C. and hydrogenated vegetable oil having a melting point of 55° to 70° C., and also soft fatty hydrocarbons, for example vaseline. The iodine number of the fatty additive is within a range of 0 to 200, preferably 0 to 50.

"Oily additve" in particular denotes liquid triglycerides of animal or vegetable origin, for example coconut oil, sunflower oil and cottonseed oil; these oils can also be hydrogenated. Other compounds included are saturated liquid hydrocarbon having boiling points, under atmospheric conditions, of above 200° C., preferably above 300° C., for example paraffin oil and white oil. The iodine number of the oily additive is within the range of 0 to 200, preferably 0 to 50.

The solid and liquid triglycerides have hydrolysis numbers of 180 to 270 and melting points of 10° to 90° C., preferably 20° to 70° C.

The amount of waxy, fatty or oily additive contained in the dispersion according to the invention is 2 to 70, preferably 5 to 50, and in particular 10 to 40, percent by weight (relative to the total amount of polyvinyl ester and additive). The polymerization is carried out in the presence of the total amount of additive, or the additive is homogeneously dispersed, for example by stirring it in, in the dispersion obtained after the polymerization is complete.

Additives used according to the invention do not separate out from coats and bondings prepared from the dispersion according to the invention. Incompatabilities which interfere with their use do not therefore arise.

The dispersion, according to the invention, has a viscosity of 1 to 100 Pa.s, preferably of 5 to 60 Pa.s (Epprecht Rheomat 30 viscometer, system C 1). Coats prepared from the dispersion are hydrophilic and readily re-emulsifiable with water. This re-emulsifiability persists even on moderate heating. The dispersion can be processed without difficulty and is distinguished by good adhesive properties, in particular for cellulose-containing materials, for example wood and paper. It is therefore particularly suitable for the preparation of adhesives.

The dispersion according to the invention also makes possible the bonding of cellulose-containing material to other materials, for example metals such as sheet iron or sheet aluminum, the bond strength being considerably higher than for an analogous dispersion without additive. The bond strength of a bonding obtainable by means of the dispersion is determined in line with DIN 53,254 as follows:

The dispersion to be tested is applied in a thickness of 0.3 mm to a test piece made of beech wood. Another test piece, either made from the same wood or from another material, for example Erichsen-test sheet iron (DIN 1,624) is pressed onto the layer obtained over an area of 3 cm$^2$ for 10 minutes under a pressure of 1 bar. After 48 hours' storage, the bond strength is determined by means of a tensioning machine and the arithmetic mean is calculated in N/mm$^2$ from 20 bondings.

The examples which follow serve to illustrate the invention in more detail. Percentage data are in each case percentage data by weight, unless otherwise stated.

EXAMPLE 1

65 kg of demineralized water were added to a reactor equipped with a horseshoe stirrer, reflux condenser, metering-in devices and a heatable and coolable jacket, and 4 kg of polyvinyl alcohol having a degree of hydrolysis of 88 mole % and a 4% strength aqueous solution of which has a viscosity of 26 mPa.s, 2 kg of polyvinyl alcohol having a degree of hydrolysis of 98 mole % and a 4% strength aqueous solution of which has a viscosity of 20 mPa.s, and 0.5 kg of polyvinyl alcohol having a degree of hydrolysis of 98 mole % and a 4% strength aqueous solution of which has a viscosity of 4 mPa.s were dissolved in the water at 80° C. A mixture of 90 kg of vinyl acetate and 10 kg of a paraffin oil having a boiling point of 340° C. were allowed to run into the solution with stirring, and 300 g of maleic acid, 135 kg of dibenzoyl peroxide and 15 g of potassium persulfate were added. The resulting mixture was then heated to the reflux temperature of the vinyl acetate. The polymerization was complete after 4 hours. The reaction material was cooled down to room temperature and its pH was adjusted to a value of 5.0 by stirring in 2 kg of 16% strength aqueous sodium hydroxide solution.

EXAMPLES 2 TO 5

Example 1 was repeated in each case with the proviso that the following vinyl acetate/paraffin oil mixtures were used:
Example 2: 80 kg of vinyl acetate and 20 kg of paraffin oil
Example 3: 70 kg of vinyl acetate and 30 kg of paraffin oil
Example 4: 60 kg of vinyl acetate and 40 kg of paraffin oil
Example 5: 50 kg of vinyl acetate and 50 kg of paraffin oil.

EXAMPLES 6 TO 10

Example 1 was repeated in each case with the proviso that instead of the vinyl acetate/paraffin oil mixture, mixtures of vinyl acetate and beef fat (hydrolysis number 200, iodine number 39) or coconut oil (hydrolysis number 260, iodine number 9) were now used.
Example 6: 85 kg of vinyl acetate and 15 kg of beef fat
Example 7: 70 kg of vinyl acetate and 30 kg of beef fat
Example 8: 60 kg of vinyl acetate and 40 kg of a beef fat
Example 9: 85 kg of vinyl acetate and 15 kg of coconut oil
Example 10: 70 kg of vinyl acetate and 30 kg of coconut oil.

APPLICATION EXAMPLES 1 TO 10

The viscosity of the dispersions obtained according to Examples 1 to 10 was determined, and the bond strength of bondings using these dispersions was investigated. A dispersion prepared analogously to Example 1 but without additives, using 100 kg of vinyl acetate, was used as a comparison. The results can be seen from Table 1.

TABLE 1

| Example | Viscosity (Pa.s) | Bond strength (N/mm$^2$) Wood/wood | Bond strength (N/mm$^2$) Wood/iron |
|---|---|---|---|
| Comparison | 17 | 7.7 | 4.0 |
| 1 | 20 | 9.6 | 5.5 |
| 2 | 28 | 13 | 8.5 |
| 3 | 31 | 13 | 9.0 |
| 4 | 29 | 11 | 9.0 |
| 5 | 30 | 9.6 | 8.0 |
| 6 | 25 | 10.2 | 8.2 |
| 7 | 28 | 9.0 | 7.1 |
| 8 | 35 | 6.1 | 5.9 |
| 9 | 26 | 10.8 | 8.3 |
| 10 | 26 | 8.8 | 7.4 |

EXAMPLE 11

62.5 kg of demineralized water were added to a reactor of the type described in Example 1, and 4.5 kg of polyvinyl alcohol having a degree of hydrolysis of 88 mole % and a 4% strength aqueous solution of which had a viscosity of 26 mPa.s, and 3 kg of polyvinyl alcohol having a degree of hydrolysis of 88 mole % and a 4% strength aqueous solution of which had a viscosity of 4 mPa.s were dissolved in the water at 80° C. 1.25 g of cobalt acetate, 250 g of maleic anhydride, 210 g of dibenzoyl peroxide and 250 g of 30% strength hydrogen peroxide were added to this solution. 25 kg of comminuted paraffin (melting range: 50° to 60° C.) were then added, and 75 kg of vinyl acetate were allowed to flow in. Simultaneously with the addition of the vinyl acetate, the mixture was heated to the reflux temperature of vinyl acetate. The polymerization was complete after 4 hours.

EXAMPLE 12

Example 11 was repeated with the proviso that a vinyl acetate/paraffin mixture of 50 kg of vinyl acetate and 50 kg of paraffin was used.

APPLICATION EXAMPLES 11 AND 12

The viscosity of the dispersions obtained according to Examples 11 and 12 was determined, and the bond strength of bondings using the dispersions was investigated. A dispersion prepared analogously to Example 11 but without additives, using 100 kg of vinyl acetate, was used as a comparison. The results can be seen from Table 2.

TABLE 2

| Example | Viscosity (Pa.s) | Bond strength (N/mm²) Wood/wood | Wood/iron |
|---|---|---|---|
| Comparison | 34 | 8.5 | 7.8 |
| 11 | 20 | 13 | 9.4 |
| 12 | 21 | 9.5 | 8.5 |

EXAMPLE 13

52.5 kg of demineralized water were added to a reactor of the type described in Example 1, and 3 kg of polyvinyl alcohol having a degree of hydrolysis of 88 mole % and a 4% strength aqueous solution of which had a viscosity of 26 mPa.s, and 2 kg of polyvinyl alcohol having a degree of hydrolysis of 98 mole % and a 4% strength aqueous solution of which had a viscosity of 20 mPa.s, were dissolved in the water. 1.25 kg of cobalt acetate, 250 g of maleic acid monomethyl ester, 250 g of acrylic acid, 125 g of t-butyl peroctoate and 250 g of 30% strength hydrogen peroxide were added to this solution. 30 kg of vaseline were then added, and 70 kg of vinyl acetate were allowed to flow in. Simultaneously with the addition of the vinyl acetate, the reaction mixture was heated to the reflux temperature of vinyl acetate. The polymerization was complete after 6 hours. A solution of 2.5 kg of polyvinyl alcohol having a degree of hydrolysis of 88 mole % and a 4% strength aqueous solution of which had a viscosity of 40 mPa.s, in 27.5 kg of water was then stirred into the mixture.

EXAMPLE 14

Example 13 was repeated with the proviso that a vinyl acetate/vaseline mixture of 50 kg of vinyl acetate and 50 kg of vaseline was used.

APPLICATION EXAMPLES 13 AND 14

The viscosity of dispersions obtained according to Examples 13 and 14 was determined, and the bond strength of bondings using these dispersions was investigated. A dispersion prepared analogously to Example 13 but without additives, using 100 kg of vinyl acetate, was used as a comparison. The results can be seen from Table 3.

TABLE 3

| Example | Viscosity (Pa.s) | Bond strength (N/mm²) Wood/wood | Wood/iron |
|---|---|---|---|
| Comparison | 8 | 8.5 | 4.5 |
| 13 | 12 | 12 | 11 |
| 14 | 8 | 6.4 | 5.5 |

EXAMPLE 15

65 kg of demineralized water were added to a reactor of the type described in Example 1, and 4 kg of polyvinyl alcohol having a degree of hydrolysis of 88 mole % and a 4% strength aqueous solution of which had a viscosity of 25 mPa.s, 2 kg of polyvinyl alcohol having a degree of hydrolysis of 98 mole % and a 4% strength aqueous solution of which had a viscosity of 20 mPa.s, and 2 kg of polyvinyl alcohol having a degree of hydrolysis of 88 mole % and a 4% strength aqueous solution of which had a viscosity of 4 mPa.s, were dissolved in the water. 300 g of maleic acid, 90 g of dibenzoyl peroxide, 10 g of dicyclohexyl peroxodicarbonate, 2 g of hydroquinone monomethyl ether and 2 0 g of potassium persulfate as well as 90 kg of vinyl acetate and 10 kg of hydrogenated tallow (melting point 55° C., iodine number 1, hydrolysis number 205) were added with stirring to this solution. The polymerization was initiated by heating the mixture to the reflux temperature of vinyl acetate. The reaction temperature reached its maximum of 86° C. after 4 hours. A further 100 g of 30% strength hydrogen peroxide were then added, and the dispersion was kept for a further hour at a temperature of 80° C. After cooling down to room temperature, the pH of the dispersion was adjusted to a value of 5.5 by stirring in 2 kg of a 16% strength aqueous sodium hydroxide solution.

EXAMPLES 16 TO 19

Example 15 was repeated in each case with the proviso that vinyl acetate and tallow were used in the following amounts:
Example 16: 80 kg of vinyl acetate and 20 kg of tallow
Example 17: 70 kg of vinyl acetate and 30 kg of tallow
Example 18: 60 kg of vinyl acetate and 40 kg of tallow
Example 19: 50 kg of vinyl acetate and 50 kg of tallow.

APPLICATION EXAMPLES 15 TO 19

The viscosity of the dispersions obtained according to Examples 15 to 19 was determined, and the bond strength of bondings using these dispersions was investigated. A dispersion prepared analogously to Example 15 but without additives, using 100 kg of vinyl acetate, was used as a comparison. The results can be seen from Table 4.

TABLE 4

| Example | Viscosity (Pa.s) | Bond strength (N/mm²) Wood/wood | Wood/iron |
|---|---|---|---|
| Comparison | 22 | 7.1 | 2.2 |
| 15 | 17 | 9.1 | 4.8 |
| 16 | 19 | 11 | 7.6 |
| 17 | 22 | 11 | 8.6 |
| 18 | 21 | 9.0 | 3.8 |
| 19 | 22 | 4.5 | 2.4 |

EXAMPLE 20

65 kg of demineralized water were added to a reactor of the type described in Example 1, and 4 kg of polyvinyl alcohol having a degree of hydrolysis of 88 mole % and a 4% strength aqueous solution of which had a viscosity of 26 mPa.s, 2 kg of polyvinyl alcohol having a degree of hydrolysis of 98 mole % and a 4% strength aqueous solution of which had a viscosity of 20 mPa.s, and 2 kg of polyvinyl alcohol having a degree of hydrolysis of 88 mole % and a 4% strength aqueous solution of which had a viscosity of 4 mPa.s, were dissolved in the water. 100 g of azodiisobutyronitrile and 20 g of ammonium persulfate as well as 90 kg of vinyl acetate and 10 kg of hydrogenated vegetable fat (melting point 65° C., iodine number 4, hydrolysis number 190), were added with stirring to this solution. The polymerization was initiated by heating the mixture to the reflux temperature of vinyl acetate. After the maximum temperature of 83° C. had been reached after 4 hours, 100 g of 30% strength hydrogen peroxide and 100 g of ascorbic acid were added. After the dispersion had cooled down to room temperature, its pH was adjusted to a value of 4.5 by means of 2 kg of a 16% strength aqueous sodium hydroxide solution.

EXAMPLES 21 TO 24

Example 20 was repeated in each case with the proviso that vinyl acetate and vegetable fat were used in the following amounts:

Example 21: 80 kg of vinyl acetate and 20 kg of vegetable fat

Example 22: 70 kg of vinyl acetate and 30 kg of vegetable fat

Example 23: 60 kg of vinyl acetate and 40 kg of vegetable fat

Example 24: 50 kg of vinyl acetate and 50 kg of vegetable fat

APPLICATION EXAMPLES 20 TO 24

The viscosity of the dispersions obtained according to Examples 20 to 24 was determined, and the bond strength of bondings using these dispersions was investigated. A dispersion prepared analogously to Example 20 but without additives, using 100 kg of vinyl acetate, was used as a comparison. The results can be seen from Table 5.

TABLE 5

| Example | Viscosity (Pa.s) | Bond strength (N/mm$^2$) Wood/wood | Wood/iron |
|---|---|---|---|
| Comparison | 17 | 7.4 | 1.3 |
| 20 | 18 | 8.2 | 4.4 |
| 21 | 21 | 9.2 | 5.1 |
| 22 | 31 | 9.1 | 6.1 |
| 23 | 40 | 7.2 | 6.3 |
| 24 | 43 | 6.4 | 4.2 |

EXAMPLE 25

65 kg of demineralized water were added to a reactor of the type described in Example 1, and 4 kg of polyvinyl alcohol having a degree of hydrolysis of 88 mole % and a 4% strength aqueous solution of which had a viscosity of 23 mPa.s, 2 kg of polyvinyl alcohol having a degree of hydrolysis of 94 mole % and a 4% strength aqueous solution of which had a viscosity of 30 mPa.s, and 0.5 kg of polyvinyl alcohol having a degree of hydrolysis of 98 mole % and a 4% strength aqueous solution of which had a viscosity of 3 mPa.s, were dissolved in the water. 70 kg of vinyl acetate, 30 kg of paraffin oil (boiling point: 300° C.), 250 g of maleic anhydride and 200 g of sodium oxymethanesulfonate were added with stirring to this solution. The mixture was heated to reflux temperature with stirring, and in the course of 5 hours, 5 kg of an aqueous 1% strength solution of hydrogen peroxide were metered in. During this period, the temperature gradually increased to 85° C. The dispersion was then allowed to cool down to room temperature.

APPLICATION EXAMPLE 25

The viscosity of the dispersion obtained according to Example 25 was determined, and the bond strength of bondings using this dispersion was investigated. A dispersion prepared analogously to Example 25 but without additives, using 100 kg of vinyl acetate, was used as a comparison. The results can be seen from Table 6.

TABLE 6

| Example | Viscosity (Pa.s) | Bond strength (N/mm$^2$) Wood/wood | Wood/iron |
|---|---|---|---|
| Comparison | 53 | 9.8 | 5.5 |
| 25 | 51 | 10.7 | 8.3 |

EXAMPLE 26

87.5 kg of demineralized water were added to a reactor of the type described in Example 1, and 10 kg of polyvinyl alcohol having a degree of hydrolysis of 88 mole % and a 4% strength aqueous solution of which had a viscosity of 18 mPa.s, were dissolved in the water. 70 kg of vinyl acetate and 30 kg of hydrogenated tallow (melting point 55° C., iodine number 3, hydrolysis number 195), and additionally 1 g of hydroquinone monomethyl ether, 300 g of itaconic acid, 50 g of dibenzoyl peroxide and 30 g of ammonium persulfate, were added to this solution. The mixture was heated with stirring to the reflux temperature of vinyl acetate. The reaction temperature reached its maximum of 87° C. after 4 hours. After a further 30 minutes, 100 g of 30% strength hydrogen peroxide and 100 g of ascorbic acid were added. 30 minutes later the mixture was cooled down to room temperature and its pH was adjusted to a value of 4.8 by the addition of 5 kg of a 4% strength aqueous sodium hydroxide solution.

EXAMPLE 27

Example 26 was repeated with the proviso that vinyl acetate and tallow were used in amounts of 50 kg each.

APPLICATION EXAMPLES 26 TO 27

The viscosity of the dispersions obtained according to Examples 26 and 27 was determined, and the bond strength of bondings using these dispersions was investigated. A dispersion prepared analogously to Example 26 but without additives, using 100 kg of vinyl acetate, was used as a comparison. The results can be seen from Table 7.

TABLE 7

| Example | Viscosity (Pa.s) | Bond strength (N/mm$^2$) Wood/wood | Wood/iron |
|---|---|---|---|
| Comparison | 13 | 7.5 | 4.8 |
| 26 | 10 | 8.6 | 6.9 |
| 27 | 38 | 6.7 | 7.0 |

We claim:

1. An aqueous polyvinyl ester dispersion having a solids content of 40 to 70 percent by weight, in which a part of the solids is a waxy, fatty or oily additive, which dispersion consists essentially of 5 to 60 percent by weight of a waxy, fatty or oily additive and 3 to 15 percent by weight (relative to the total amount of polyvinyl ester and additive) of a polyvinyl alcohol which has a degree of hydrolysis of 65 to 99.5 mole percent and which has, at a 4 percent by weight strength aqueous solution, a viscosity of 2 to 50 mPa.s, measured at a temperature of 20° C.

2. A process for the preparation of an aqueous polyvinyl ester dispersion having a solids content of 40 to 70 percent by weight, in which a part of the solids is a waxy, fatty or oily additive, by free radical polymerization of a vinyl ester in an aqueous emulsion in the presence of a polyvinyl alcohol, which process comprises carrying out the polymerization in the presence of 3 to 15 percent by weight (relative to the total amount of polyvinyl ester and additive) of a polyvinyl alcohol which has a degree of hydrolysis of 65 to 99.5 mole percent and which has, at a 4 percent by weight strength aqueous solution, a viscosity of 2 to 50 mPa.s, measured at a temperature of 20° C., and in the presence of a waxy, fatty or oily additive.

3. A process for the preparation of an aqueous polyvinyl ester dispersion having a solids content of 40 to 70 percent by weight, in which a part of the solids is a waxy, fatty or oily additive, by free radical polymerization of a vinyl ester in an aqueous emulsion in the presence of a polyvinyl alcohol, which process comprises carrying out the polymerization in the presence of 3 to 15 percent by weight (relative to the total amount of polyvinyl ester and additive) of a polyvinyl alcohol which has a degree of hydrolysis of 65 to 99.5 mole percent and which has, at a 4 percent by weight strength aqueous solution, a viscosity of 2 to 50 mPa.s, measured at a temperature of 20° C., and then homogeneously dispersing the waxy, fatty or oily additive in the dispersion obtained.

4. The use of a dispersion as claimed in claim 1 for the preparation of adhesives for cellulose-containing materials.

* * * * *